Nov. 14, 1939.   N. O. PANZEGRAU ET AL   2,179,860

TRACK ROLLER

Filed July 3, 1937

Inventors
Norman O. Panzegrau
and Samuel T. Hoener
By V. F. Larusque
Atty.

Patented Nov. 14, 1939

2,179,860

UNITED STATES PATENT OFFICE 2,179,860

TRACK ROLLER

Norman O. Panzegrau and Samuel T. Hoener, Chicago, Ill., assignors to International Harvester Company, a corporation of New Jersey Application July 3, 1937, Serial No. 151,790

4 Claims. (Cl. 308—168)

This invention relates to an improved construction of track rollers for use in connection with the traction devices of track type tractors.

Each of these track rollers is usually mounted in side frames on a stationary shaft formed with a thrust flange intermediate its ends, and serves to transmit the load of the tractor to the ground run of the endless track belts. As these rollers are thus subjected to severe loads, it is important that they be sturdily constructed, so as to withstand these loads.

Each track roller is mounted for rotation on a pair of carrier sleeves rotatably carried on the shaft with the thrust flange disposed between the adjacent inner ends of the carrier sleeves. It is important that these rollers be designed to facilitate manufacture and assembly thereof, and that the bearing surfaces be ample to take the loads and prevent wear. It is also important that the bearing surfaces be properly lubricated both at slow and relatively high speed turning of the rollers, particularly those bearing surfaces between opposite faces of the thrust flange and adjacent inner ends of the carrier sleeves.

The main object of the invention, therefore, is to provide bearing or thrust members to be disposed between opposite faces of the thrust flange and adjacent inner ends of the carrier sleeves.

An important object of the invention is to provide these bearing members with lubricant reservoirs which are adapted to distribute lubricant over the faces of the thrust flange.

Another important object is to provide the thrust flange with a notch or recess adapted to cooperate with the lubricant reservoirs in the bearing members in the distribution of lubricant over the bearing faces between the thrust flange and the bearing members.

Another object of the invention is generally to provide an improved track roller construction for the purposes stated.

Briefly, these and other objects may be achieved by the practicable form of the invention herein illustrated and described, in which form the side track frame of a crawler tractor carries brackets for mounting a stationary shaft, which between its ends is upset to form an intermediate thrust flange. This thrust flange is provided with a recess or notch on a vertically extending radius of the flange. A pair of carrier sleeves are rotatably carried by the stationary shaft on each side of the intermediate thrust flange. A track roller is fitted over the carrier sleeves and mounted for rotation therewith between the side members of the track frame. A bearing or thrust member, having a lubricant reservoir, is positioned between the inner end of each carrier sleeve and each face of the thrust flange. Each lubricant reservoir is open to the thrust flange and to the shaft and is adapted to receive lubricant from the notch in the thrust flange and to distribute it over opposite faces of the thrust flange. In this manner, opposite faces of the thrust flange are properly lubricated to provide a suitable bearing surface to take endwise thrust of the roller.

A more complete understanding of the objects and desirable features may be had from the following description and the illustrations in the accompanying sheet of drawings, in which.

Figure 1:
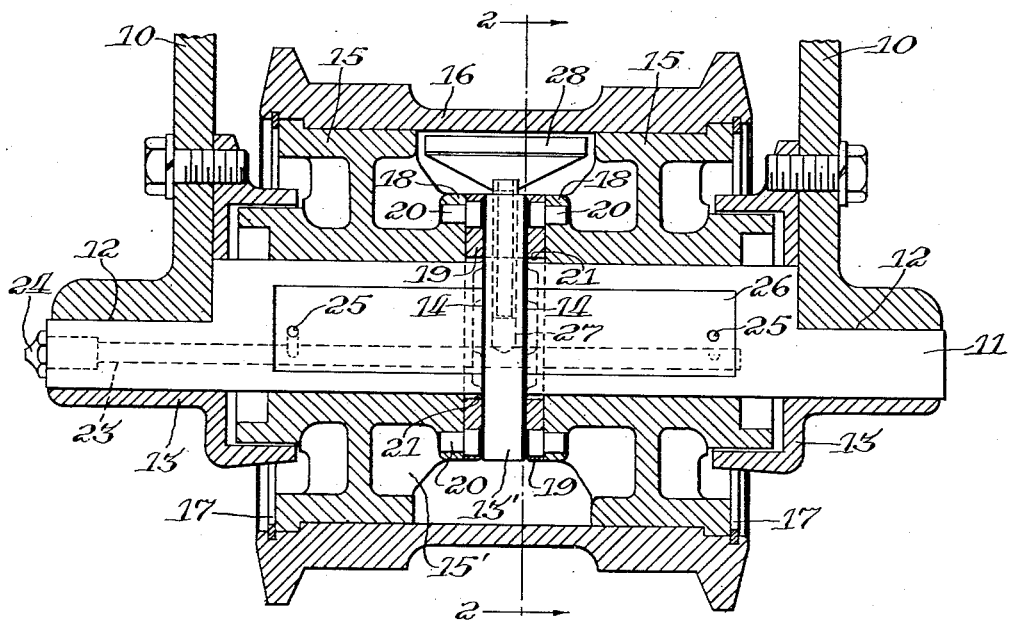
Figure 1 is a vertical sectional view of a preferred form of track roller construction embodying the invention.

The track type tractor side truck frame comprises spaced side channel frame members 10, cross-connected by a top plate, not shown, which is more or less conventional construction. A horizontal stationary shaft 11, being cut out at its ends to form flat upper surfaces 12, is carried transversely across the side frame members 10 and secured thereto by bearing brackets 13. The flat surfaces 12 engage the lower edges of the side frame members 10, and rotation of the shaft 11 is thereby prevented. Intermediate its ends, the shaft is provided with a thrust flange 13', having opposite faces 14, which are machined to provide bearing surfaces for a purpose to be hereinafter described. The thrust flange 13' is cut out on a vertically extending radius thereof to provide a notch or recess 13a, which is preferably V-shaped for a purpose to be described later. A pair of carrier sleeves or hubs 15 are turnably mounted on the shaft 11 between the side frame members 10, with the thrust flange 13' disposed between adjacent inner ends thereof. A track roller 16 is fitted over the carrier sleeves 15 and mounted for rotation therewith, and is provided at each end with a snap ring 17 for preventing axial displacement thereof with respect to the carrier sleeve 15. Each carrier sleeve 15, at its inner end, is provided with an annular flange 18. A pair of bearing members in the form of thrust washers 19 surround the shaft 11, one being disposed between each flange 18 of the carrier sleeve 15 and each bearing face 14 of the thrust flange 13'.

The bearing members 19 are mounted for rotation with the carrier sleeves 15, being secured thereto by pins 20. Each bearing member 19 is provided with a pocket or lubricant reservoir 21, which is open to a bearing face of the thrust flange and to the shaft 11. This opening or reservoir 21 is adapted to cooperate with the notch 13a in the thrust flange for distributing lubricant over the bearing face of the thrust flange.

Figure 2:
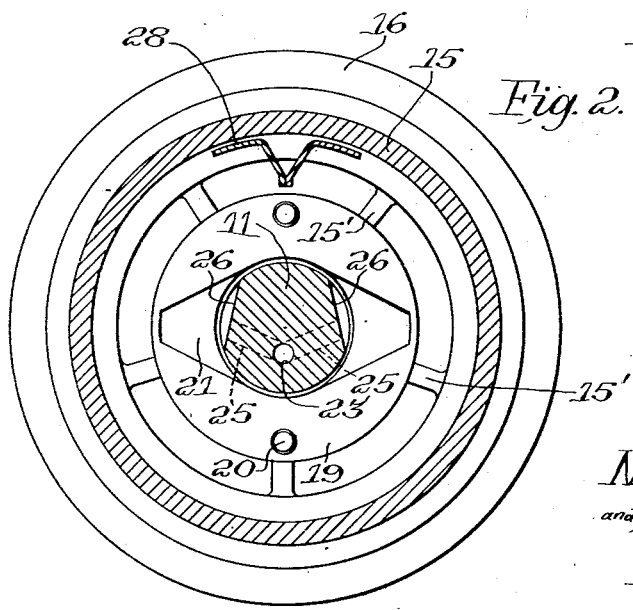
Figure 2 is a sectional view taken on the line 2—2 of Figure 1.
Figure 3:
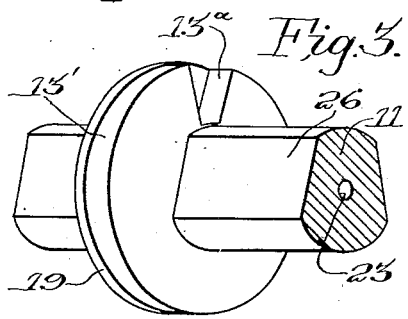
Figure 3 is a perspective view showing the notch in the thrust flange, also showing the relation between the shaft, thrust flange and one of the bearing members.
Figure 4:
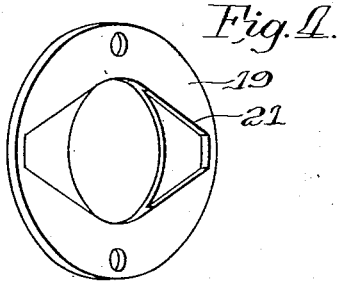
Figure 4 is a perspective view of one of the bearing members showing the lubricant reservoir or opening therein.

The shaft 11 is provided with an axial bore 23 substantially centrally disposed therein. A pressure lubricant fitting 24 is fitted into an enlarged end of the bore at one end of the shaft 11 for supplying lubricant thereto and to communicating lubricant passages 25 extending from the bore 23 to oppositely disposed flat surfaces 26 of the shaft 11, as shown in Figure 2. In this manner, lubricant supplied through the fitting 24 is distributed over the flat surfaces 26 and from there entirely over the shaft 11 to lubricate the bearing surfaces between the shaft and the carrier sleeves 15.

As previously mentioned, the lubricant reservoirs 21 in the bearing members 19 are open to the shaft 11 and to the bearing faces 14 of the thrust flange 13'. In this manner, the reservoirs 21 are adapted to receive a slight amount of lubricant from the shaft 11.

To further augment the lubrication of the track roller assembly, a certain amount of lubricant is contained within the track roller 16 and between the carrier sleeves 15, said parts forming a cylinder closed at its ends. For the purpose of distributing this lubricant about the entire assembly, the carrier sleeves 15 are provided with radially disposed rib, web, or blade portions 15', and lubricant in the lower portion of the track roller is carried upwardly by rotation thereof. The thrust flange 13' is provided with a radial bore 27, which extends vertically therein in the thrust flange on the same radius as the notch 13a and communicates with the axial bore 23 in the shaft 11. A funnel or scoop member 28 is secured to a pipe or tube, which is fitted into the bore 27, as best shown in Figure 1. Lubricant carried to the top of the roller assembly by the web portions 15' of the carrier sleeves 15 and by the track roller 16 is received by the funnel or scoop member 28 and passes downwardly through the bore 27 to the axial bore 23, from whence it is distributed through the bores 25 to the flat surfaces 26 on the shaft 11. The main object of the invention, however, is to provide for a considerable amount of the lubricant to be received by the notch 13a in the thrust flange; and this lubricant passes into the openings or reservoirs 21 in the bearing members or washers 19 as they rotate with the carrier sleeves past the notch.

It will be seen that this manner of lubrication is extremely desirable, as the bearing members 19 are mounted for rotation with the carrier sleeves 15. In this manner the angular positions of the lubricant reservoirs 21 are constantly changed with respect to the notch 13a and the thrust flange 13'. Because of this provision in the structure and function as provided by the present invention, lubricant is continually supplied to the bearing surfaces 14 of the thrust flange 13', as the bearing members 19 virtually wipe these faces with a continual supply of lubricant.

From the foregoing description, it will be apparent that provision has been made for properly lubricating a generally improved track roller construction. It will be understood that numerous modifications and alterations may be made in the practicable example chosen for the purposes of this disclosure without departing from the spirit and scope of the invention as indicated in the following claims.

What is claimed is:

1. A track roller assembly comprising a stationary shaft having a thrust flange intermediate its ends, said thrust flange being notched at a point on its periphery, a pair of carrier sleeves turnable on the shaft with the thrust flange disposed between adjacent inner ends thereof, a track roller carried by said carrier sleeves for rotation therewith, said sleeves and roller providing a cylinder for containing lubricant, and a bearing member carried by each carrier sleeve at the inner end thereof for rotation therewith between each carrier sleeve and the thrust flange, each of said members having a bearing face contacting a side of the thrust flange, said bearing members being provided with pockets extending partly thereinto for receiving lubricant directly through the notch in the thrust flange from the sleeves and roller for distribution over opposite sides of the thrust flange upon rotation of the sleeves and roller.

2. A track roller assembly comprising a stationary shaft formed with a thrust flange intermediate its ends, said thrust flange having a notch therein, a pair of carrier sleeves turnable on the shaft with the thrust flange disposed between adjacent inner ends thereof, a track roller carried by said carrier sleeves for rotation therewith, said sleeves and roller providing a cylinder closed at its ends for containing lubricant, and a thrust washer carried by each carrier sleeve at the inner end thereof for rotation therewith between each carrier sleeve and the thrust flange, each of said washers having a bearing face contacting a side of the thrust flange, and each thrust washer being provided with a lubricant receiving opening open to opposite sides of the thrust flange, rotation of the sleeves and roller thereby distributing lubricant through the notch in the flange directly to the openings in the washers for lubricating the aforesaid bearing faces.

3. A track roller assembly comprising a stationary shaft formed with a thrust flange intermediate its ends, said thrust flange having a notch therein open to its periphery, a pair of carrier sleeves turnable on the shaft with the thrust flange disposed between the adjacent inner ends thereof, a track roller carried by said carrier sleeves for rotation therewith, said sleeves and roller providing a cylinder closed at its ends for containing lubricant, portions of said lubricant entering the notch in the thrust flange, and a pair of bearing members, each formed with a central opening substantially fitting the shaft and each disposed between the inner end of a respective carrier sleeve and the respective side of the thrust flange on the shaft, each member being further formed with a radially extending lubricant receiving pocket closed at its radially outermost end and communicating with the aforesaid central opening, said members being associated with the carrier sleeves for rotation therewith with respect to the thrust flange, the aforesaid pockets in the bearing members receiving lubricant directly and intermittently from the notch in the thrust flange as said pockets are rotated past the notch.

4. A track roller assembly comprising a stationary shaft formed with a circular coaxial thrust flange intermediate its ends, said thrust flange having a vertical notch open to its periphery, a pair of carrier sleeves turnable on the shaft with the thrust flange disposed between adjacent inner ends thereof, a track roller carried by said carrier sleeves for rotation therewith, said sleeves and roller providing a cylinder closed at its end for containing lubricant, portions of said lubricant being directed into the notch in the thrust flange, and a pair of circular bearing members surrounding the shaft, one disposed between the inner end of each carrier sleeve and each side of the thrust flange, each member being provided with a radially extending lubricant receiving pocket open to a side of the thrust flange, the radially outward extent of each pocket being less than the radius of the thrust flange, said members being associated with the carrier sleeves for rotation therewith, said lubricant receiving pockets being adapted intermittently to receive lubricant from the notch in the thrust flange as the pockets are rotated past said notch.

NORMAN O. PANZEGRAU.
SAMUEL T. HOENER.